Nov. 8, 1949   B. BERMAN   2,487,297
AUTOMOBILE SLED
Filed May 28, 1948   3 Sheets-Sheet 1
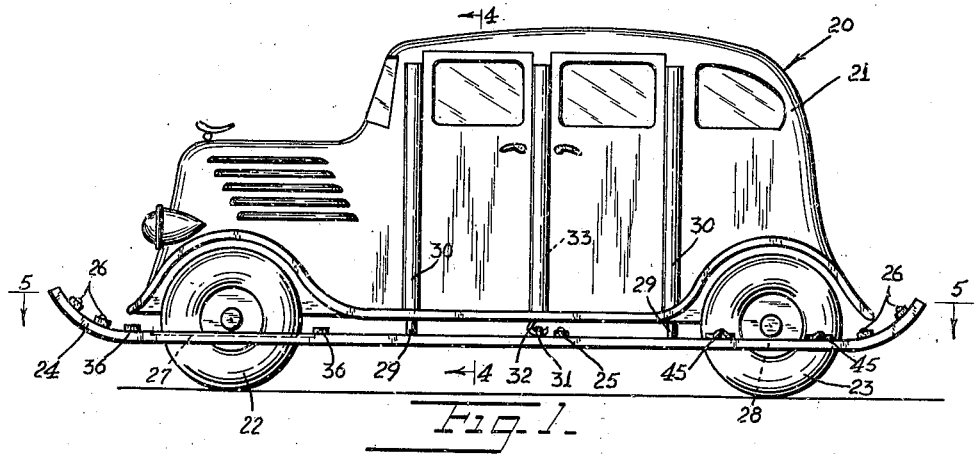
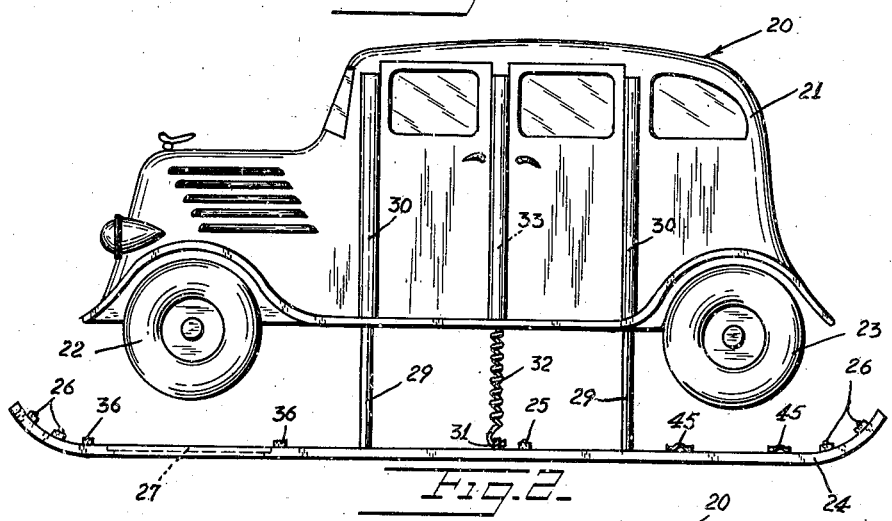
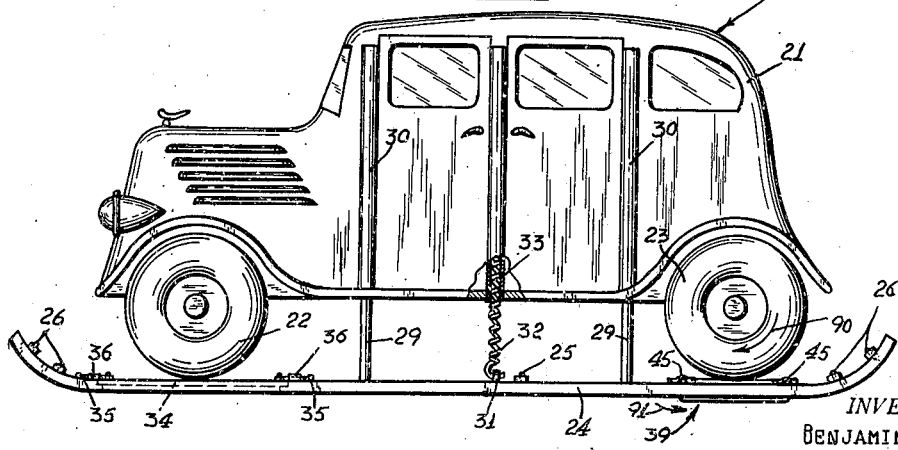
INVENTOR.
BENJAMIN BERMAN
BY
*Zoltan Holschek*
ATTORNEY

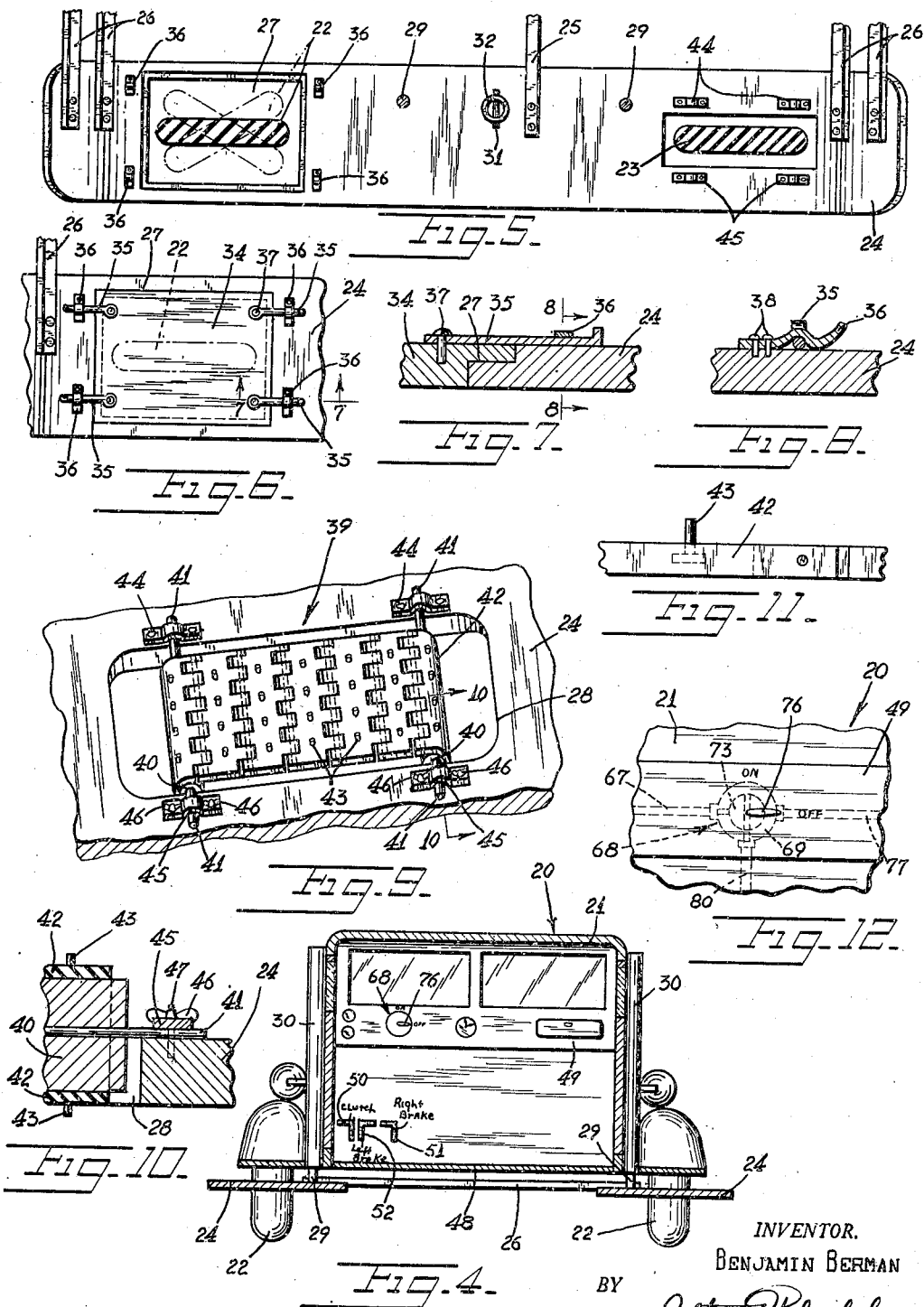

Nov. 8, 1949           B. BERMAN           2,487,297

AUTOMOBILE SLED

Filed May 28, 1948           3 Sheets-Sheet 3

INVENTOR.
BENJAMIN BERMAN
BY
ATTORNEY

Patented Nov. 8, 1949

2,487,297

UNITED STATES PATENT OFFICE 2,487,297

AUTOMOBILE SLED

Benjamin Berman, Brooklyn, N. Y.

Application May 28, 1948, Serial No. 29,731

10 Claims. (Cl. 180—5)

This invention relates to new and useful improvements in an automobile provided with skis.

More specifically, the invention proposes the construction of an automobile provided with skis arranged in a manner that the skis may be extended beneath the wheels of the automobile to facilitate movement of the automobile on snow and ice.

Still another object of the present invention proposes the construction of skis connected together for unitary movement and normally retained in a raised position beneath the running board of the vehicle and provided with openings aligned with the wheels in a manner so that the wheels extend therethrough to permit the automobile to roll on its wheels when the skis are in the raised inoperative position.

A further object of the present invention proposes the provision of removable plate members for closing the openings aligned with the front wheels of the automobile and upon which the front wheels rest when the skis are extended in operative position beneath the wheels, in a manner to permit unhampered movement of the automobile over the snow and ice on the skis.

Another object of the present invention proposes the provision of removable treads for extension across the openings aligned with the rear wheels of the automobile and upon which the rear wheels rest when the skis are extended in operative position beneath the wheels in a manner so that rotations of the rear wheels in a reverse direction will cause the treads to be rotated to propel the automobile in a forward direction on the skis.

Still another object of the present invention proposes a novel valve controlled hydraulic mechanism upon the vehicle in a manner to control the extension and retraction of the skis relative to the wheels of the automobile.

Still further, the present invention proposes mounting the valve of the hydraulic mechanism upon the dash board of the automobile, in a manner to be readily available to the operator of the automobile without the necessity of leaving his seat.

A still further object of the present invention proposes contraction springs interposed between the skis and the automobile body in a manner to hold the skis in their raised inoperative position.

It is a further object to provide an automobile with skis which are quickly and easily shifted between operative and inoperative positions, which are simple and durable and which can be applied to an automobile without materially increasing the cost thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an automobile provided with skis in accordance with the present invention and with the skis in a raised inoperative position.

Fig. 2 is a view similar to Fig. 1, but illustrating the skis in an intermediate position between their operative position and inoperative position.

Fig. 3 is another view similar to Fig. 1, but illustrating the skis in their operative position.

Fig. 4 is a vertical sectional view of the automobile taken on the line 4—4 of Fig. 1.

Fig. 5 is a plan view of one of the skis per se looking in the direction of the line 5—5 of Fig. 1.

Fig. 6 is a view similar to a portion of Fig. 5, but illustrating the removable plate member in position in the front opening of the ski.

Fig. 7 is a vertical sectional view taken on the line 7—7 of Fig. 6.

Fig. 8 is a vertical sectional view taken on the line 8—8 of Fig. 7.

Fig. 9 is a perspective view of one of the treads mounted in position in the rear opening of the ski.

Fig. 10 is a partial vertical sectional view taken on the line 10—10 of Fig. 9.

Fig. 11 is a side elevational view of a portion of the endless track of the tread.

Fig. 12 is an enlarged front elevational view of the control valve for the hydraulic mechanism mounted on the dash board of the automobile.

Figure 13:
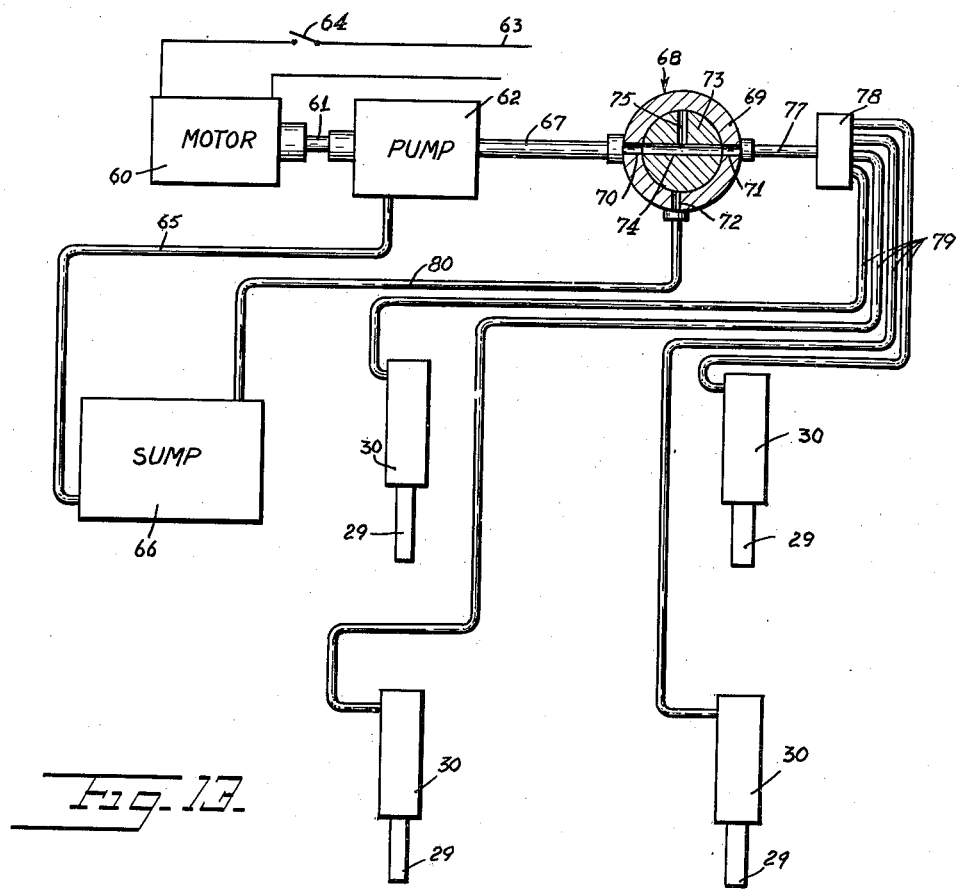
Fig. 13 is a diagrammatic view of the hydraulic mechanism of the present invention.

The skis, according to the present invention, are shown applied to an automobile 20 having the usual body 21, front wheels 22 and rear wheels 23. The skis 24 are extended longitudinally of the automobile 20 in alignment with the front wheels 22 and the rear wheels 23. Intermediate of their ends, the skis 24 are connected together by a laterally extended strut 25. The front and rear ends of the skis 24 extend beyond the front and rear ends of the automobile 20 and the front and rear extended ends of the skis 24 are connected together by struts 26, see Fig. 5. When the skis 24 are in the raised inoperative position shown in Fig. 1, the front and rear struts 26 act as front and rear bumpers for the automobile 20.

As shown in Fig. 5, the front ends of the skis 24 are formed with openings 27 aligned with the front wheels 22 of the automobile and the rear ends of the skis 24 are formed with openings 28 aligned with the rear wheels 23. When the skis are in the raised inoperative position shown in Figs. 1 and 4, the front wheels 22 project through the front openings 27 and the rear wheels 23 project through the rear openings 28. As clearly shown in Fig. 5, the front openings 27 for the front wheels 22 are materially wider than the rear openings 28 so as to allow free steering movements of the front wheels 22 within the openings 27 when the skis are in the raised inoperative position.

Between the openings 27 and 28, each ski 24 is provided with a pair of longitudinally spaced pistons 29 which extend vertically therefrom and which are slidably received in cylinders 30 formed at the sides of the body 21 of the automobile 20. Hydraulic mechanism, to be hereinafter described, is provided for controlling the extension and retraction of the pistons 29 from the cylinders 30.

At points approximately midway between the pistons 29, the skis 24 are provided with upwardly extending lugs 31 to which the bottom ends of contraction springs 32 are attached. The top ends of the contraction springs 32 are anchored within hollow passageways 33 formed at the sides of the body 21 between the cylinders 30. The springs 32 function to retain the skis 24 in their raised inoperative position shown in Fig. 1.

Removable plate members 34 are provided for closing the front openings 27 in the skis 24. These removable plate members 34 are mounted in position when the automobile is to run on the skis and the front wheels 22 rest on the top faces of the plate members 34 when the skis 24 are in the operative position shown in Fig. 3.

The plate members 34 are removably secured in position by means of pivotally mounted latches 35 mounted on the top face of the plate members 34 and which engage complementary keepers 36 mounted on the top faces of the skis 24 adjacent the openings 27. As shown in Fig. 7, the latches 35 are pivotally attached to the top face of the plate members 34 by means of pins 37. The latch members 36 are securely attached to the top face of the skis 24 by means of pins 38, see Fig. 8.

Treads 39 are provided for engagement beneath the rear wheels 23 in the operative position of the skis 24. The treads 39 are adapted to be mounted in the rear openings 28 and have the rear wheels 23 rest thereon so that rotations of the rear wheels 23 in a reverse direction will cause the treads to be rotated to propel the automobile in a forward direction.

Each of the treads 39 comprises a pair of spaced rollers 40 formed at their ends with extended trunnions 41. An endless track 42 extends over the rollers 40 and is provided with projecting members 43 which are adapted to engage and grip the ice or snow. The projecting members 43 also improve the grip between the tires of the rear wheels 23 and the surface of the endless tracks 42. If desired, the tires of the rear wheels could also be provided with corrugations or teeth to engage the endless tracks 42 and improve the driving contact between those parts. As shown in Fig. 10, the endless tracks 42 may be made of rubber or other similar material.

The trunnions 41 at one side of the openings 28 are received in bearings 44 fixedly attached to the top face of the skis 24 at the same side of the opening. The other trunnions 41 are received in bearings 45 releasably attached to the top face of the skis 24 on the other side of the openings 28. The bearings 45 are releasably secured in position by means of thumb nuts 46 which engage threaded studs 47 which extend from the top face of the skis 24. When the bearings 45 are removed from the top face of the skis 24 then the trunnions 41 at the opposite sides of the rollers 40 may be slipped into and out of the fixedly mounted bearings 44 for mounting the treads 41 in position or for removing them from the skis 24. It is preferred that the removable bearing 45 be positioned along the outer sides of the skis 24 so that they will be easily accessible to one putting on and removing the treads 39 from the skis 24.

The interior of the body 21 of the automobile 20 is provided with the usual floor 48, see Fig. 4, and dash board 49. Also, within the body 21, there is the usual clutch pedal 50 and separate brake pedals 51 and 52 for the right and left rear wheels, respectively. The brake pedals 51 and 52 are located immediately adjacent one another so that they may be simultaneously depressed for braking both the rear wheels when the automobile is operating normally on its wheels 22 and 23. However, the brake pedals 51 and 52 may be separately depressed to individually brake the rear wheels 23 when the automobile is operating on the skis so as to make it possible for the automobile to turn corners. When it is desired to make a right turn when the automobile is operating on the skis 24 it is merely necessary to step on the right brake pedal 51 which will stop the right rear wheel 23 from turning, leaving the left rear wheel 23 free to turn. Rotations of the left rear wheel 23 will turn its respective tread 39 and cause the automobile 20 to turn to the right about the right rear wheel 23 which will remain stationary. To turn the automobile 20 to the left, the same procedure is followed except that the left brake pedal 52 is depressed. It is to be understood that the usual differential (not shown) of the automobile 20 allows the rear wheels 23 to rotate independently when one of the pedals 51 or 52 is depressed.

Figure 14:
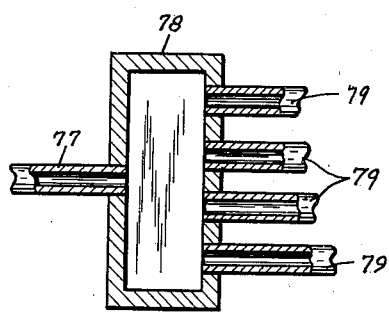
Fig. 14 is a sectional view of the distributor box of the hydraulic mechanism.
Figure 15:
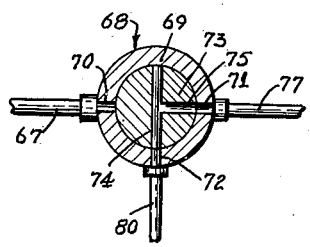
Fig. 15 is another view of the valve of the hydraulic mechanism but showing the same in a different position.

The hydraulic mechanism for extending and retracting the pistons 29 from the cylinders 30 for extending and retracting the skis 24 is shown in Figs. 13 to 15. This mechanism includes a motor 60 having a driven shaft 61 connected to a pump 62. On Fig. 13 there is schematically illustrated the circuit 63 for energizing the motor 60. The circuit 63 includes in series the usual source of electric current, which in this case is the battery of the automobile 20, the motor 60 and a manually closable switch 64. The switch 64 is preferably mounted on the dash board 49 of the vehicle 20 adjacent the driver's seat so that the switch may be conveniently closed when it is desired to energize the motor 60. The intake side of the pump 62 is connected by means of a pipe 65 with a sump 66 containing a hydraulic fluid. The discharge side of the pump 62 is in turn connected by means of a pipe 67 with a manually controllable valve 68 mounted on the dash board 49 of the automobile 20, see Figs. 4 and 12.

The manually controllable valve 68 includes a casing 69 formed with passages 70, 71 and 72 located ninety degrees from each other. Within the casing 69 there is a rotatable valve member 73 having a passage 74 extended diametrically therethrough and a branch passage 75 extended laterally from the passage 74. As shown in Figs. 13 and 14, the passage 70 of the casing 69 is connected with the pipe 67 leading from the pump 62. The rotatable valve member 73 is connected to an external handle 76, see Figs. 4 and 12, by which the valve member 73 may be turned between on and off positions.

A pipe 77 connects the passage 71 of the valve casing 69 with a hollow distributor 78. Separate pipes 79 connect the interior of the hollow distributor 78 with each of the cylinders 30 of the skis 24. Thus, with the valve 68 turned to the on position shown in Fig. 13 and the switch 64 closed, the motor 60 will be energized to rotate the pump 62 to pump hydraulic fluid from the sump 66 through the pipe 67, the passage 70, the passage 74 (the passage 75 will be blocked by the intermediate wall of the casing 69), the passage 71, the pipe 77 to the hollow distributor 78. From the hollow distributor 78, the hydraulic fluid will discharge through each of the pipes 79 to the cylinders 30 and extend the pistons 29 and raise the automobile 20 on the skis 24 as shown in Fig. 2.

The passage 72 of the valve casing 69 is connected by means of a pipe 80 to discharge back into the sump 66. Thus, when the valve member 73 of the valve 68 is turned to the off position shown in Fig. 15, the passage 75 will be connected to the passage 71 of the casing 69 and one end of the passage 74 will be connected to the passage 72 of the casing 69 and the other end of the passage 74 will be blocked by the intermediate wall of the casing 69. In this position, the weight of the automobile 20 on the pistons 29 will exhaust the hydraulic fluid from the cylinders 30 through the pipes 79, the distributor 78, the pipe 77, the passage 71, the passage 75, the passage 74, the passage 72 and the pipe 80 back to the sump 66.

The operation of the automobile provided with skis in accordance with the present invention is as follows:

When the automobile 20 is running on dry land, the skis 24 will be in the raised position shown in Fig. 1 with the wheels 22 and 23 extended through the openings 27 and 28 in the skis to engage the ground. The skis will be retained in this raised inoperative position by the contraction springs 32.

When it is desired to have the automobile run on snow or ice on the skis 24, the switch 64 is closed with the valve 68 turned to the on position shown in Fig. 13. This will cause the motor 60 to be energized to turn the pump 62 and pump hydraulic fluid from the sump 66 to the cylinders 30 to extend the pistons 29 therefrom to raise the automobile 20 to the position shown in Fig. 2.

In the raised position, the removable plate members 34 are mounted in position to close the front openings 27 in the skis 24 and the treads 39 are mounted in the rear openings 28 of the skis 24. When the plate members 34 and the treads 39 have been mounted in position, the valve 68 is turned to the off position shown in Fig. 15 allowing the hydraulic fluid to exhaust from the cylinders 30 under the weight of the automobile 20 permitting the automobile to move downward to the position shown in Fig. 3 in which the front wheels 22 rest on the top face of the plate members 34 and the rear wheels 23 rest on the top face of the treads 39; the automobile is now ready to move over snow or ice on the skis 24.

To return the skis to the inoperative position shown in Fig. 1, the switch 64 is again closed with the valve 68 in the on position shown in Fig. 13, so that hydraulic fluid will again be pumped to the cylinders 30 to extend the pistons 29 to raise the automobile 20 to the position shown in Fig. 2. The plate members 34 and the treads 39 are then removed, and the valve 68 is then turned to the off position shown in Fig. 15 so that the hydraulic fluid will be exhausted from the cylinders 30 back into the sump 66. After the wheels 22 and 23 touch the ground in moving from the position shown in Fig. 2 to the position shown in Fig. 1, the final stage of movement of the skis 24, to the fully inoperative position, is effected by the springs 32, drawing the skis upward into the fully inoperative position shown in Fig. 1.

In order to operate the automobile 20 on the skis 24 it is necessary to have the motor turning in a reverse direction to turn the rear wheels 23 in a direction which would normally cause the automobile 20 to move backwards. This rotation of the rear wheels 23 will be reversed by the treads 39 so as to cause the vehicle to move in a forward direction, see the arrows 90 and 91 on Fig. 3.

While the skis of the present invention are shown applied to an automobile of the passenger type on the drawings, this is by way of illustration only, as the present invention is also applicable to passenger buses, trucks, and other similar land vehicles and may also be adapted to airplanes.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest.

2. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said skis being connected together for unitary movement by struts extended laterally between the skis.

3. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said skis being connected together for unitary movement by struts extended laterally between the skis, said skis being extended beyond the front and rear ends of the automobile, and certain of said struts being extended between the skis at the ends thereof forming bumpers for the automobile when the skis are in the raised inoperative position.

4. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said means for holding the skis in an inoperative raised position comprising contraction springs connected between said skis and the body of the automobile.

5. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said removable plates being retained in position by means of pivotally mounted latches on the top face of the plates, and keepers mounted on the skis and engaged by the latches.

6. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said treads including continuous endless tracks of rubber engaged by said rear wheels.

7. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said treads including continuous endless tracks of rubber engaged by said rear wheels, and projecting members extending from said endless tracks for engaging the snow or ice over which the skis are moving.

8. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said extending means for said skis being hydraulically operated.

9. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and treads mounted in the back openings of the skis when the automobile is running on the skis and on the top face of which the rear wheels of the automobile rest, said extending means for said skis being hydraulically operated, said hydraulic extending means including a manually operable valve mounted on the dash board of the vehicle.

10. In an automobile having front and rear wheels, a pair of skis extended parallel to and longitudinally between each pair of front and rear wheels, said skis being formed with openings aligned with the wheels and through which the wheels extend when the skis are in an inoperative raised position, means for holding the skis in an inoperative raised position with the wheels extended through the openings so that the car may run on dry land, means for extending the skis to positions beneath the wheels when the automobile is to run on snow or ice on the skis, removable plate members mounted in the front openings of the skis when the automobile is running on the skis and on the top face of which the front wheels of the automobile rest, and threads mounted in the back openings of the skis when the automobile is running on the skis and on the top face of which the rear wheels of the automobile rest, said extending means for said skis being hydraulically operated, said hydraulic extending means including a pair of cylinders for each of said skis mounted on the automobile and each having an extendable piston connected to its respective ski.

BENJAMIN BERMAN.

REFERENCES CITED

The following references are of record in the file of this patent:

UNITED STATES PATENTS

| Number | Name | Date |
| --- | --- | --- |
| 1,355,853 | Habsburg-Lothringen | Oct. 19, 1920 |
| 1,622,719 | Hofmeister | Mar. 29, 1927 |
| 2,051,496 | Sarrazin | Aug. 18, 1936 |

FOREIGN PATENTS

| Number | Country | Date |
| --- | --- | --- |
| 652,025 | Germany | Oct. 23, 1937 |